May 31, 1938.   W. J. SMITH   2,119,299
COMBINED ACCELERATION AND BRAKE CONTROL MEANS
Filed Aug. 14, 1937   2 Sheets-Sheet 1
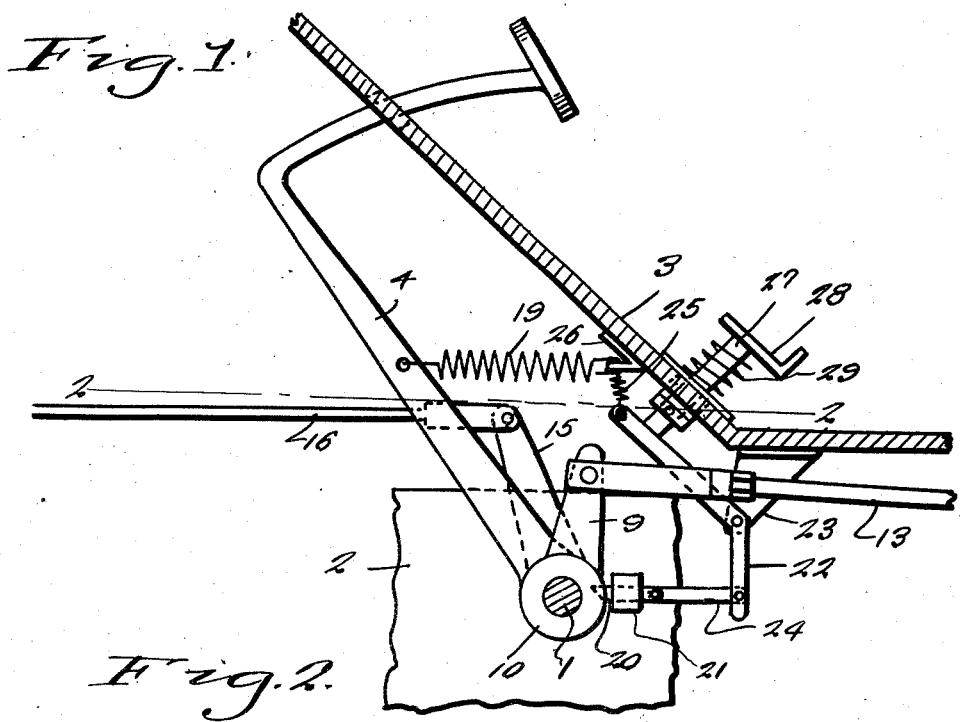
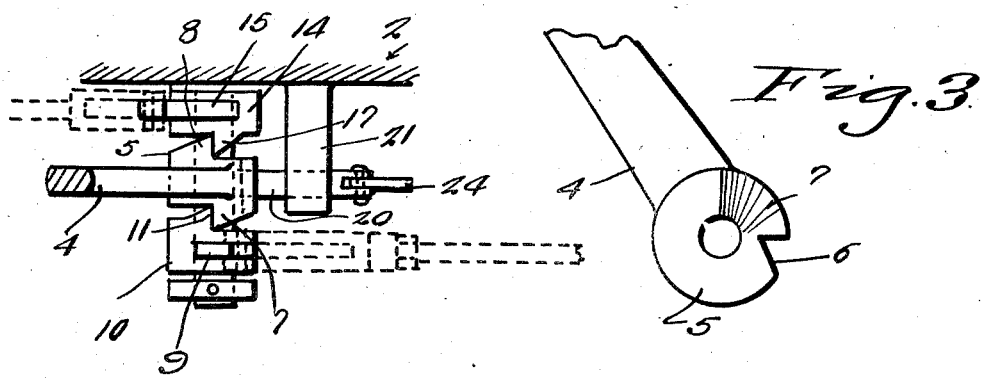
Inventor
William J. Smith
By Clarence A. O'Brien
Hyman Berman
Attorneys May 31, 1938.　　　　　W. J. SMITH　　　　　2,119,299
COMBINED ACCELERATION AND BRAKE CONTROL MEANS
Filed Aug. 14, 1937　　　2 Sheets-Sheet 2
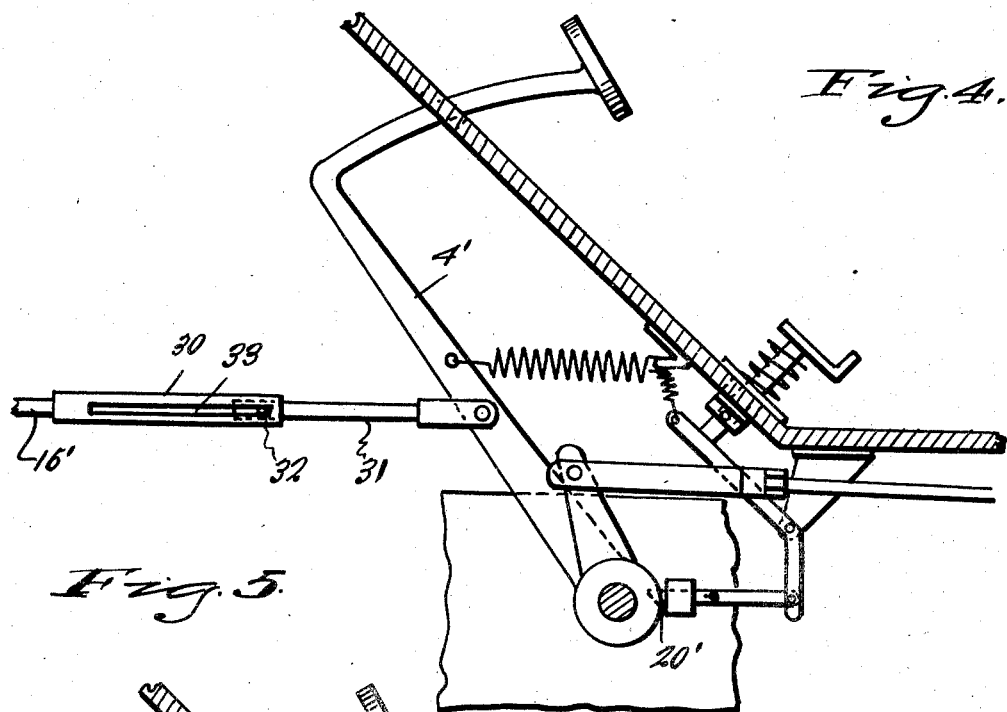
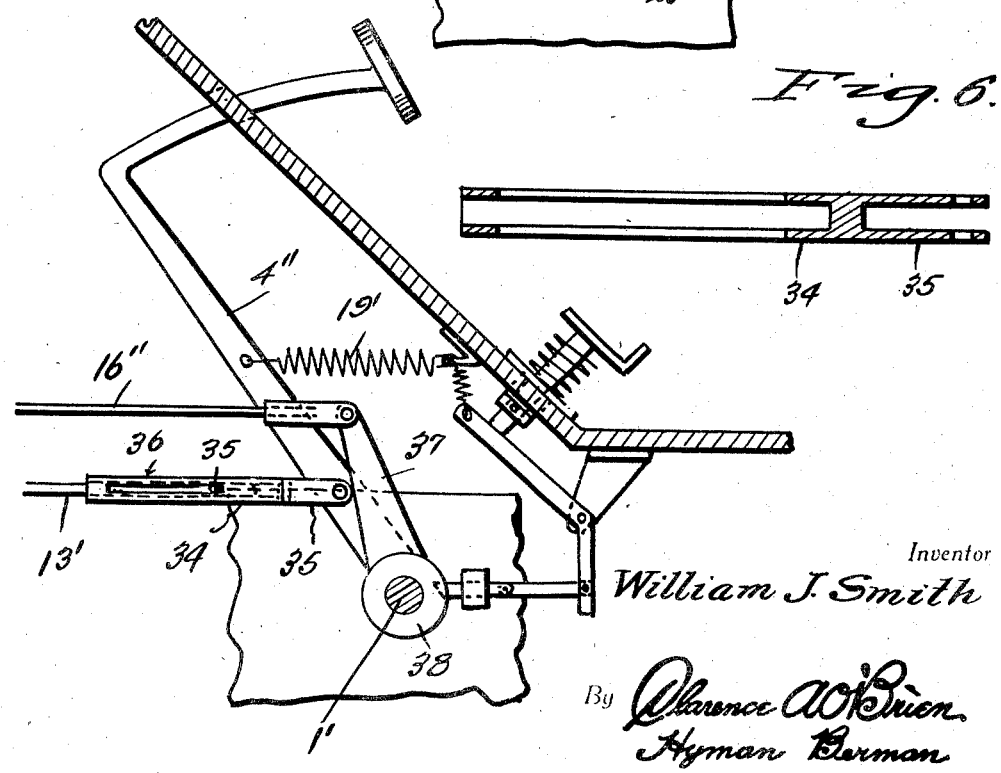
Inventor
William J. Smith
By Clarence A. O'Brien
Hyman Berman
Attorneys Patented May 31, 1938

2,119,299

UNITED STATES PATENT OFFICE 2,119,299

COMBINED ACCELERATION AND BRAKE CONTROL MEANS

William J. Smith, Delaware City, Del.

Application August 14, 1937, Serial No. 159,172

4 Claims. (Cl. 192—3)

This invention relates to combined means for controlling acceleration and braking of a vehicle, the general object of the invention being to provide a pedal with means for applying the brakes when the pedal is depressed, and means for controlling acceleration by movement of the pedal in an opposite direction.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a fragmentary vertical sectional view through a portion of a vehicle, showing the invention in use.

Figure 2 is a section on the line 2—2 of Figure 1.

Figure 3 is a fragmentary side view of the pedal shank and showing the notch therein.

Figure 4 is a view similar to Figure 1 but showing a modification.

Figure 5 is a view of another modification of the invention.

Figure 6 is a longitudinal sectional view through the forked slotted member connecting a rod to the shank of the pedal.

In these drawings, the numeral 1 indicates a stationary shaft attached to a part 2 of the vehicle, parts of the floor board of which are shown at 3. A foot pedal 4 has a hub 5 at its lower end which is rotatably arranged on the shaft 1 and said part 5 is formed with a notch 6 in a part of its circumference and at one side thereof has a beveled tooth 7 and the opposite side a similar tooth 8, these teeth extending in opposite directions as clearly shown in Figure 2.

An arm 9 has a hub 10 connected to its lower end and this hub 10 is also rotatably arranged on the shaft 1 and has a tooth 11 extending from one side thereof for engaging the tooth 7, these parts being so arranged that as the pedal is depressed the teeth 7 and 11 will engage and thus the hub 10 and the arm 9 will move forwardly with the pedal. A control rod 13 is connected to the arm 9 and actuates the brakes of the vehicle.

A third hub 14 is rotatably arranged on the shaft 1 and there is an arm 15 which has connected thereto a rod 16 which leads to the throttle of the motor of the vehicle and the hub 14 has a tooth 17 for engaging the tooth 8 on the return movement of the pedal as these teeth are so formed that upon depression of the pedal the tooth 8 simply leaves the tooth 17.

From the foregoing it will be seen that when the pedal is depressed the brake control rod 13 is actuated and then as the pedal is released the brakes are released by the usual spring means and when the pedal is permitted to move rearwardly by the spring 19 which connects the pedal with the floor board, the tooth 8 on hub 5 will engage the tooth 17 on the hub 14 and thus the rod 16 will be caused to open or partly open the throttle.

Means are provided for normally holding the pedal in position with the throttle at idling position, it being understood that the spring 19 tends to move the pedal 4 to a position which would move the throttle to fully open position. Such means includes a pawl 20 slidably arranged in the guideway 21 on the part 2 and having its beveled end adapted to engage the notch 6, the parts being so formed as to limit rearward movement of the pedal under the action of the spring 19 as shown in Figure 1. A bellcrank lever 22 is pivoted to a bracket 23 depending from one of the floor boards and a link 24 pivotally connects the lower end of the lever 22 with the pawl. A spring 25 is connected with the upper end of the lever and with a bracket 26 connected to a floor board and to which the spring 19 may also be connected. This spring 25 tends to hold the lever 22 in a position with the dog or pawl engaging the notch 6. A shank 27 is slidably arranged in a socket in one of the floor boards and has its front end resting against the upper part of the lever 22, the other end of the shank having a foot rest 28 thereon and a spring 29 encircles the shank when spaced normally from the rest 28.

When the vehicle is in use the operator has the heel of one foot resting on the member 28 and the sole of said foot engaging the foot member of the pedal 4. The shank 27 can be depressed sufficiently to cause the lever 22 to release the pawl 20 without the spring 29 offering resistance to the movement of the parts. This will permit the pedal 4 to be readily manipulated by the foot to control the speed of the car from the throttle by the control rod 16. During the use of the invention as an accelerator the spring 29 serves as a support for the foot which has the heel resting on the plate 28 and the parts sufficiently depressed to release the pawl 20 and to have the part 28 resting lightly on the spring 29. Then when it is desired to apply the brakes the entire foot can be moved toward the floor board so as to depress the pedal which will cause application of the brake and, of course, the throttle spring will close the throttle as the brake is being depressed. The two pedal members are so arranged as to make the distance between them practically constant during the braking operation.

In the modification shown in Figure 4 the hub and arm for the throttle control rod are eliminated and a slotted barrel 30 is connected with the control rod 16' and a rod 31 is pivotally connected with the pedal 4' and said rod 31 extends into the barrel and has a transverse pin 32 on its forward end which engages the slots 33 of the barrel. These slots are so arranged that upon depression of the pedal the rod 31 will simply slide into the barrel without moving the throttle but on rearward movement of the pedal, when the pawl 26 is released the pin 32 will engage the rear ends of the slots 33 and thus exert a pull upon the rod 16' to open or partly open the throttle. In other respects this form of the invention is similar to that before described.

In the modification shown in Figure 5 a slotted barrel 34 has a forked end 35, see Figure 6, which is pivoted to the pedal 4'' and the brake control rod 13' enters the barrel and has a pin 35 at its rear end which engages the slots 36 of the barrel. This control rod extends forwardly to engage the brake means and as will be seen when the pedal is depressed the rear ends of the slots 36 in the barrel will engage the pin 35 and thus the rod 13' will be pushed forwardly to apply the brakes. Upon rearward movement of the pedal the pin 35 will simply slide in the slots 36 and thus the brakes will remain unapplied.

In this figure the control rod for the throttle is shown at 16'' and it is connected to an arm 37 which has a hub 38 rotatably arranged on the shaft 1', this hub being caused to move with the pedal 4'' when the pedal moves rearwardly under the action of the spring 19' so as to open the throttle, movement of the pedal being communicated to the arm 37 by the teeth on the two hubs; the same is shown to the right in Figure 2.

In other respects this form of the invention is the same as that first described.

From the foregoing it will be seen that in all the forms the pedal is normally held in a neutral position with the throttle at idling speed adjustment, with means whereby the depression of the pedal will apply the brakes and rearward movement of the pedal from its neutral position will open or partly open the throttle.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention what is claimed as new is:—

1. Means for actuating the brake and accelerator rods of a motor vehicle comprising a pedal, a member on which the pedal is supported for rocking movement, an arm supported for rocking movement on said member, means for connecting one rod to said arm and means for moving the arm when the pedal is moved in one direction, the arm remaining stationary when the pedal is moved in an opposite direction and means for actuating the other rod by the pedal.

2. Means for actuating the brake and throttle of a motor vehicle comprising a pedal, a spring tending to hold the pedal in its rearmost position, means for holding the pedal in a certain position and against the action of said spring, means for applying the brakes by depression of the pedal from said certain position, means for actuating the throttle upon movement of the pedal rearwardly of said certain position and foot operated means for releasing the holding means, said means being located adjacent the foot engaged portion of the pedal whereby the same foot can operate the pedal and said means.

3. Means for actuating the brake and throttle of a motor vehicle comprising a foot pedal, means for normally holding the same in a certain position, spring means for moving the pedal rearwardly of said means, a heel operated member releasing the holding means to permit the spring to move the pedal rearwardly, means for actuating the throttle by such rearward movement of the pedal and means for applying the brakes by depression of the pedal.

4. Means for actuating the brake and throttle of a motor vehicle comprising a pedal, a spring tending to hold the pedal in its rearmost position, means for holding the pedal in a certain position and against the action of said spring, means for applying the brakes by depression of the pedal from said certain position, means for actuating the throttle upon movement of the pedal rearwardly of said certain position and foot operated means including a second pedal for releasing the holding means, said means being located adjacent the foot engaged portion of the first pedal whereby the same foot can operate the pedal and said means, the second pedal serving as a foot support during acceleration and being depressible during braking control.

WILLIAM J. SMITH.